TELEVISION SYSTEM FOR PRODUCING SUPERIMPOSED IMAGES

Filed March 11, 1959

4 Sheets-Sheet 1

INVENTORS:
Francis C. Healey
Wayne R. Johnson

By Smyth & Roston
Attorneys

INVENTORS:
Francis C. Healey
Wayne R. Johnson
By Smyth & Roston
Attorneys,

INVENTORS:
Francis C. Healey
Wayne R. Johnson
By Smyth & Roston
Attorneys

INVENTORS:
Francis C. Healey
Wayne R. Johnson
By Smyth & Roston
Attorneys, 3,145,262
Patented Aug. 18, 1964

3,145,262

TELEVISION SYSTEM FOR PRODUCING SUPERIMPOSED IMAGES

Francis C. Healey and Wayne R. Johnson, Los Angeles, Calif., assignors to Minnesota Mining and Manufacturing Company, St. Paul, Minn., a corporation of Delaware Filed Mar. 11, 1959, Ser. No. 798,719
24 Claims. (Cl. 178—5.2)

This invention relates to apparatus for transmitting and receiving a plurality of signals and, more particularly, to multi-plexing equipment for use in monochrome and color television systems.

The "NTSC" color television signal, which is standard in the United States, includes a signal representative of the luminance and brightness of the successive picture points regardless of their color and also side bands resulting from the modulation of two chrominance signals on two sub-carriers. The chrominance signals contain information relating to the hues and saturation of the colors but not to their brightness. The modulated sub-carriers which are of the same nominal frequency but in phase quadrature are combined to produce a single train of color signals modulated in both phase and amplitude.

At the beginning of each of the horizontal scanning lines which trace the color television picture, a color synchronizing signal is supplied which includes a burst of the color sub-carrier frequency. The burst of color sub-carrier frequency, which is phase advanced with respect to both modulated sub-carriers, is utilized as a reference signal to establish the phase of an oscillator in the television receiver. The signal from the oscillator in the receiver is resolved into orthogonal components which are employed in separate demodulators to recover the two chrominance signals. In general, the hues reproduced at the receiver are dependent upon the phase of the side band frequencies as compared with the phase of the periodic bursts of the reference frequency and the intensity of the hues is dependent upon the amplitude of the side band frequencies.

The "NTSC" color television signal is compatible with monochrome receivers because the luminance signal provides for a monochrome image and the color sub-carriers for successive scans of the same picture point cancel. The color sub-carriers cancel because the frequency of the color sub-carriers is an odd multiple of one-half the frame frequency so that the sub-carriers reverse in polarity between successive scans of the same picture point, passing through some whole number of cycles plus one-half during each frame period. When the color sub-carrier is received at ordinary monochrome receivers, no objectional interference results because the color sub-carrier component is cancelled by the persistence of vision over a number of scans or frames. The effective response of the eye is controlled not so much by the instantaneous stimulation provided by any one scan but by the average or integrated stimulation after a number of scans. For this reason, if the color sub-carrier frequency is an odd multiple of one-half the frame frequency or is frequency-interlaced, the color television system is compatible with the monochrome television system.

The frequency-interlace principle providing for the compatibility is effectively a method for transmitting additional information in regions of the spectrum that are left relatively vacant by the ordinary or monochrome television signal. Actually, a sub-carrier frequency signal equal to an odd multiple of one-half the line frequency of 15,734 cycles per second as well as one-half the frame frequency is utilized. In the NTSC system, a sub-carrier frequency of approximately 3.58 megacycles and actually 3.579545 megacycles is utilized.

Both the frequency-interlace principle and the two-phase or quadrature modulation for the two chrominance signals increase the amount of information that may be transmitted.

In illustrative embodiments of this invention, the frequency-interlace principle is utilized in conjunction with either monochrome or color television transmission to supply additional information. The additional information may be in the form of a secondary or additional image which may be superimposed over the primary television image at the television receiver.

At the transmitting end of the system, the horizontal synchronizing pulses of the television signals from the camera equipment are utilized to drive two synchronous generators. The first synchronous generator provides a 3.58 megacycle signal which is in step with the synchronizing pulses and which is utilized as a carrier for modulating signals provided by auxiliary camera equipment. The modulating signals and the 3.58 megacycle carrier are introduced to a balanced modulator which provides bursts of carrier frequency in accordance with the modulating signals. The auxiliary camera equipment may be utilized to scan printed tapes or other two-state graphic matter so that effectively a burst of carrier signal is provided only during the time one of the two states is being scanned. By providing bursts of modulated sub-carrier signal, the background or primary television image is undistorted when the images are superimposed at a television receiver.

The second synchronous generator provides control signals for the auxiliary camera equipment so that the modulating signals are synchronized with the television signals from the main camera equipment and also so that they occur at predetermined positions in the scanning sequence of each frame. The modulating signals, for example, may be provided only during the last portion of each frame so that the superimposed image will be along the bottom portion of the primary image.

The bursts of sub-carrier frequency are added to the rest of the television signal which may either be a monochrome television signal or a color television signal and introduced therewith to the television transmitter. The bursts of 3.58 megacycle frequency representing the modulated signal do not effect the operation of conventional monochrome receivers because of the frequency-interlace principle. The 3.58 megacycle signals for successive frames cancel as they are synchronized with the primary television signals. Features of this invention relate to the provision of an adapter which is operable in conjunction with conventional monochrome television receivers to recover the modulating signal and provide a video image in accordance therewith. The adapter includes a bandpass filter for separating the sub-carrier signals and a full wave rectifier which rectifies the sub-carrier signals and introduces the rectified sub-carrier signals to a low-pass filter. The filter removes the sub-carrier and introduces the modulating signals to a trigger circuit which responds only to the modulating signal from the auxiliary camera equipment. The modulating signal is coupled from the trigger circuit to the cathode ray tube in the receiver. The modulating signal in this manner provides for a visual image which may be superimposed upon the regular television picture. The primary television image is undistorted even where it is superimposed by the auxiliary image except at the scanned symbols of the auxiliary image. Without the adapter, the frequency-interlaced sub-carrier signals cancel and, therefore, do not provide for an image at the monochrome receiver.

In a conventional color television receiver, the bursts of sub-carrier signals are recovered and a color image thereof is superimposed over the image produced by the monochrome television signals. When the usual color television signals are being received, the chrominance information is recovered by two synchronous detectors which are driven in phase with the respective quadrature chrominance signals. With only monochrome television transmission and the bursts of sub-carrier frequency, the chrominance detectors recover the modulated information. Depending upon the phase of the bursts of modulated 3.58 sub-carrier frequency, two quadrature signals which determine the color of the resultant image will be derived therefrom. The color image which is superimposed over the monochrome image represents the auxiliary image provided by the auxiliary camera equipment.

When the auxiliary image is to be superimposed over a color image, the bursts of modulated sub-carrier frequency representing the auxiliary image are multiplexed with the usual chrominance sub-carriers and introduced therewith to the television transmitter. The additional bursts of modulated 3.58 sub-carrier may be in phase with the reference burst of color sub-carriers frequency which in the NTSC system leads one of the chrominance signals by 57° and the other by 147° so that each of the two chrominance detectors in the color receiver recovers one of the chrominance signals and a portion of the additional bursts. Each of the two recovered signals from the chrominance detectors includes, therefore, the chrominance information of the image received at the main or primary camera equipment and a component of the monochrome information received at the auxiliary camera equipment. The received color image at the color television receiver consists of two perfectly synchronized superimposed images with the color of the primary image being undistorted except at the scanned symbols representing one condition of the monochrome auxiliary image. The monochrome image is, therefore, quite clear though superimposed in color over the color image.

In another embodiment of this invention, an adapter may be utilized in conjunction with the chrominance detectors in the color television receiver. The adapter includes a third synchronous detector which is driven in phase with the reference bursts of color sub-carrier frequency to recover the modulated bursts representing the monochrome image. The recovered signal also includes a portion of each of the two quadrature chrominance signals. The recovered signal from the third detector may be added to the monochrome signal or it may be introduced to the tricolor kinescope of the color receiver as any one or any combination of the three primary colors.

In the conventional monochrome receivers, as indicated above, the 3.58 megacycle sub-carriers including both the chrominance signals and the modulated bursts representing the auxiliary monochrome image cancel. When the adapter is utilized, the trigger circuit therein discriminates between the bursts of sub-carrier frequency representing the auxiliary image and the chrominance sub-carrier signals. Features of this invention relate to another adapter which accomplishes essentially the same function of separating the bursts representing the auxiliary image from the chrominance signals representing the color of the primary image and utilizes the modulating signals of the bursts to provide a superimposed monochrome image in accordance therewith. The adapter includes three synchronous detectors driven in phase respectively with the two chrominance signals and the modulated bursts. A portion of the signals derived from the two chrominance signal detectors are subtracted from the signal derived from the third detector. The resultant signal includes substantially only the modulating signal representing the auxiliary image. The resultant signal is introduced to the receiver cathode ray tube to provide a monochrome image in accordance therewith.

Further features of this invention pertain to the provision of a computer for comparing the scanned monochrome auxiliary image with stored information in the computer. When predetermined information is scanned by the auxiliary camera equipment, the computer provides for modulating the television audio sub-carrier with a subsonic or a supersonic signal as an alarm indication. At the receiver, the adapter may include means for detecting the alarm indication and for providing an audible or visible indication in accordance therewith.

Still further features of this invention relate to the provision of means for multiplexing audio signals relating to the auxiliary image with the audio signals related to the primary image and for separating the two audio signals at the receiver so that either can be heard.

Further advantages and features of this invention will become apparent upon consideration of the following description taken in conjunction with the drawing wherein.

Figure 1:
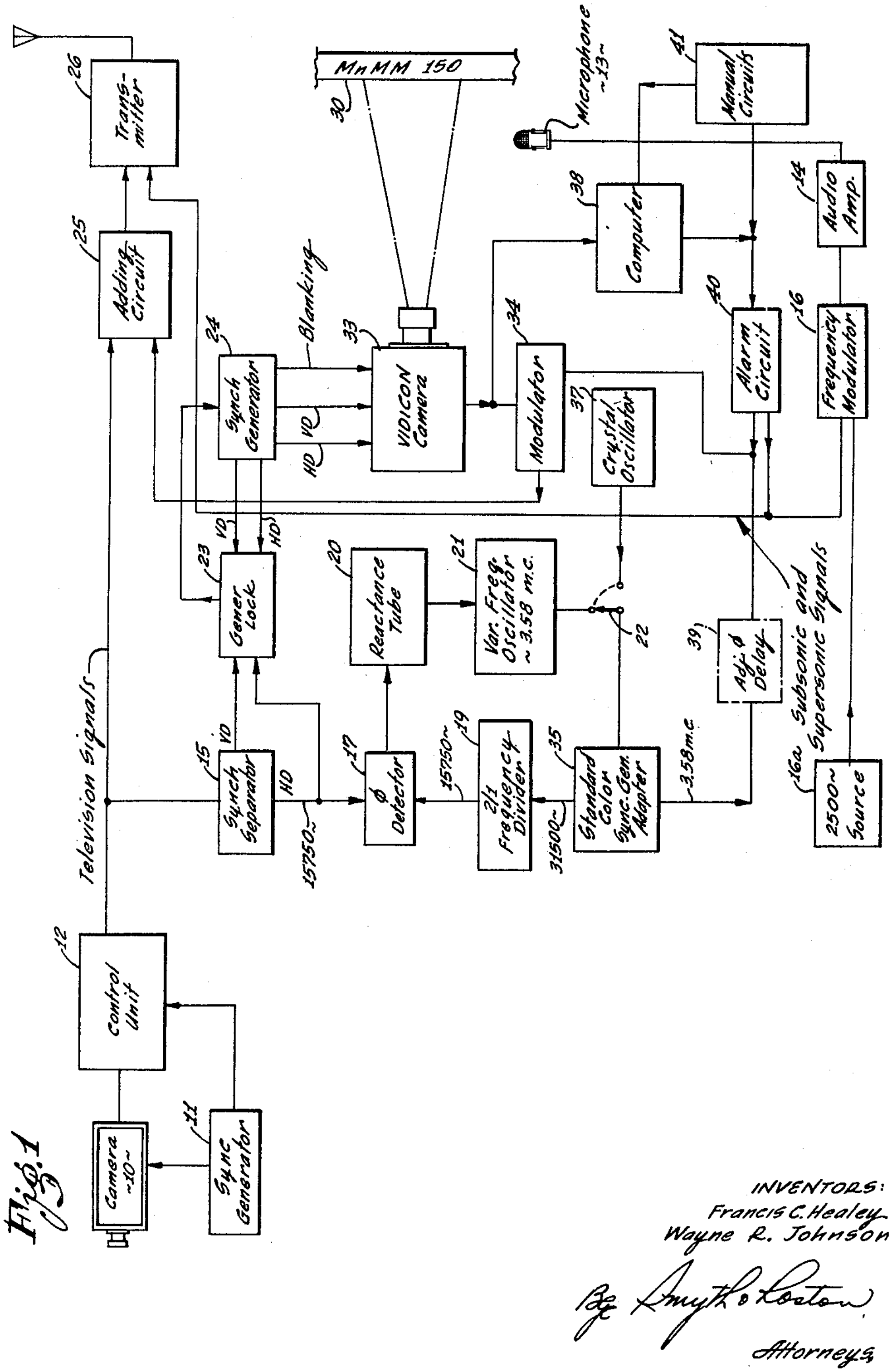
FIGURE 1 is a functional representation of the transmitting equipment of the transducer system of this invention.

Referring first to FIGURE 1, a television camera 10 is supplied with the usual scanning, blanking and synchronizing signals from a standard television synchronous generator 11. The video signals from the camera 10, which may be either monochrome or television color signals are provided through a control unit 12 which may include amplifiers and a matrix unit, not shown. The signals from the unit 12 include the video signals representing horizontal lines of a primary image scanned by the camera 10 and horizontal and vertical synchronizing pulses. The image scanned by the camera 10 is referred to as a primary image because as is hereinafter described, an auxiliary image which is scanned by a camera 33 may be superimposed over the primary image at a television receiver.

The sequence of operations of the transducing system of this invention is first described when the television signals provided by the camera 10 are monochrome signals. The transducing system, however, provides for superimposed images at both a monochrome receiver utilizing an adapter and a conventional color television receiver for either primary monochrome signals or primary color signals.

Considering first then that the primary signals are monochrome signals representing the primary image, the horizontal synchronizing pulses are separated from the monochrome television signals by a synchronizing separator 15 which supplies the horizontal synchronizing pulses to a phase detector 17. The synchronizing separator 15 also supplies vertical synchronizing pulses to a generator control or locking circuit 23 which, as is hereinafter described, controls the operation of the auxiliary camera 33.

The phase detector 17 is utilized to control a variable frequency oscillator 21 by providing an error signal to a reactance tube 20 which is coupled to the oscillator 21. The error signal is derived by the phase detector 17 by comparing the phase of the synchronizing pulses from the separator 15 with pulses from a frequency divider 19.

The frequency divider 19 is driven by means of a standard color synchronizing generator 35 from the oscillator 21. The pulses from the oscillator 21 are provided through a two-position switch 22 to the synchronizing generator 35. The generator 35 provides a first output at a nominal frequency of 31,500 pulses per second to the frequency divider 19 and a second signal at a nominal frequency of 3.58 megacycles to a balanced modulator 34.

As the phase of the horizontal synchronizing pulses which are part of the monochrome television signals change, an error signal is developed by the phase detector 17 which adjusts the phase of the oscillator 21 to compensate for the phase displacement between the horizontal synchronizing pulses and the pulses from the divider 19. In this manner, the variable frequency oscillator 21 is maintained in synchronism with the horizontal synchronizing pulses and, therefore, with the television signals from the control unit 12.

The switch 22 is a two-position switch which may be operated to disconnect the oscillator 21 and to connect a crystal oscillator 37 to the generator 35. When the camera 33 is proximately located to the camera 10, the variable frequency oscillator 21 may be unnecessary and, in fact, a single control unit, not shown, may be utilized for both cameras 10 and 33 or the crystal oscillator 37 may be utilized to provide the sub-carrier frequency to the modulator 34.

The 3.58 megacycle signal from the synchronizing generator 35 is utilized at the balanced modulator 34 as a carrier for modulating signals generated by the auxiliary television camera 33. The camera 33 is controlled by a synchronizing generator 24 which supplies thereto horizontal and vertical synchronizing pulses and blanking pulses and which is in turn controlled by the generator control circuit 23.

As described above, the generator control circuit 23 is driven by the horizontal and vertical synchronizing pulses derived by the synchronizing separator 15 from the primary television signals. The generator control circuit 23 maintains the synchronous generator 24 in step with the synchronizing signals from the separator 15. Moreover, the generator control 23 functions as a switch to cause the synchronous generator 24 to be operative only during a portion of each frame of the primary television signals by introducing a blanking signal to the camera 33 during the rest of each frame. For example, if the camera 33 is to scan a narrow printed tape 30, the synchronizing generator 24 may enable the camera 33 only during the last part of each frame.

In conventional television systems, each frame includes 525 horizontal lines and the generator control circuit 23 may enable the synchronous generator 24 only during the last 50 lines of each frame so that when reproduced at a television receiver, the image of the tape 30 appears along the bottom of the face of the picture tube.

Assuming that the tape 30 includes printed matter, the modulating signal to the modulator is a stepped or a two state signal. The output of the modulator 34 is, therefore, bursts of the 3.58 megacycle carrier as determined by the stepped modulating signal. In other words, for most of each of the line scans of the camera 33 an output would not be provided from the modulator 34 but when a portion of a letter or symbol is being scanned, the modulator 34 would provide a 3.58 megacycle signal or burst. The modulated bursts are introduced to an adding circuit 25 together with the monochrome television signals from the control unit 12.

In the adding circuit 25, the bursts of 3.58 megacycle frequency are combined with the primary television signals with the modulated bursts becoming a sub-carrier which is frequency-interlaced with the primary television signals. Both the 3.58 megacycle sub-carrier and the modulating signals are in step or synchronized with the primary television signals. The primary television signals and the sub-carrier are introduced to a transmiter 26 for transmission.

The modulating signal from the camera 33 is also introduced to a computer 38 which includes a memory, not shown, and means for comparing the signals from the camera 33 with information in the memory. Such computer equipment is well-known in the computer art.

Responsive to predetermined input signals, a control signal is provided from the computer 38 to an alarm circuit 40. The computer 38 may be manually controlled by circuits 41 to adjust the memory in the computer. The manual circuits 41 may also be utilized independently to provide a control signal to the alarm circuit 40. An operator, therefore, may visually monitor the tape 30 and at any time provide a control signal by means of the manual circuits 41 to the alarm circuit 40. Responsive to the control signal from either the computer 38 or the circuits 41, the alarm circuit 40 provides a subsonic or a supersonic signal to the transmitter 26 which is added to the audio signals that are picked up when the primary image is scanned. The audio signals and the alarm signal are modulated on the conventional 4.5 megacycle sound carrier and transmitted with the television signals and the modulated burst sub-carrier.

Ordinary audio signals such as speech and music, which are associated with the auxiliary image, may be picked up by a microphone 13 and coupled through an amplifier 14 to a frequency modulator 16. The modulator 16 functions to frequency modulate the amplified audio signals on a supersonic sub-carrier, for example, of 25,000 cycles per second from a source 16A. The 25,000 cycle per second carrier is modulated with the audio signals associated with the primary image on the conventional 4.5 megacycle sound sub-carrier. The 4.5 megacycle sub-carrier would, therefore, be modulated by the usual audio signals associated with the primary image and also by the 25,000 signal associated with the auxiliary image.

Figure 2:
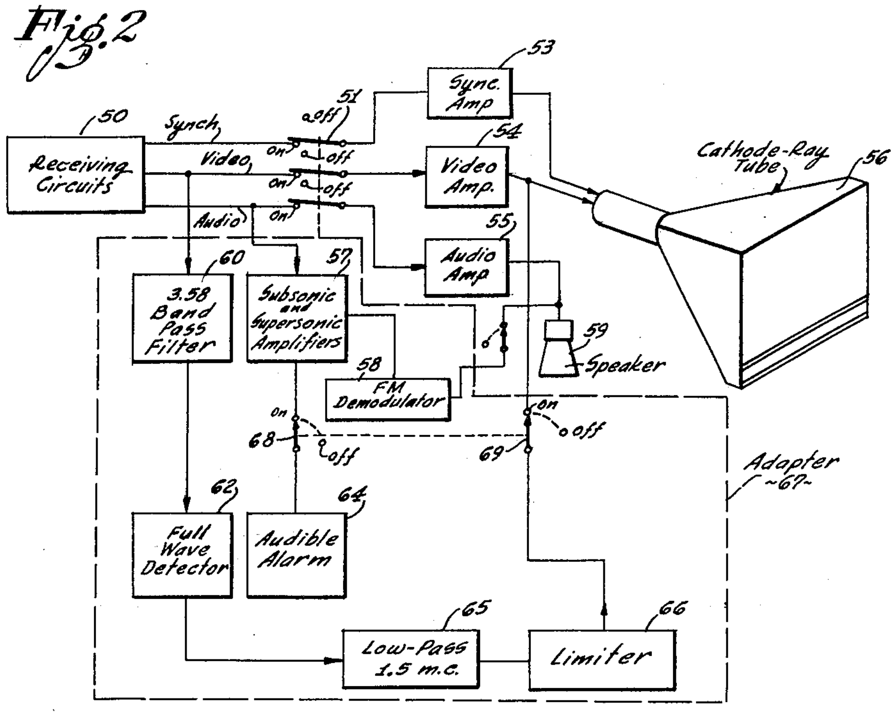
FIGURE 2 is a functional representation of a portion of a monochrome television receiver, including an adapter utilized in one embodiment of the transducer system of this invention.
Figures 4, 5:
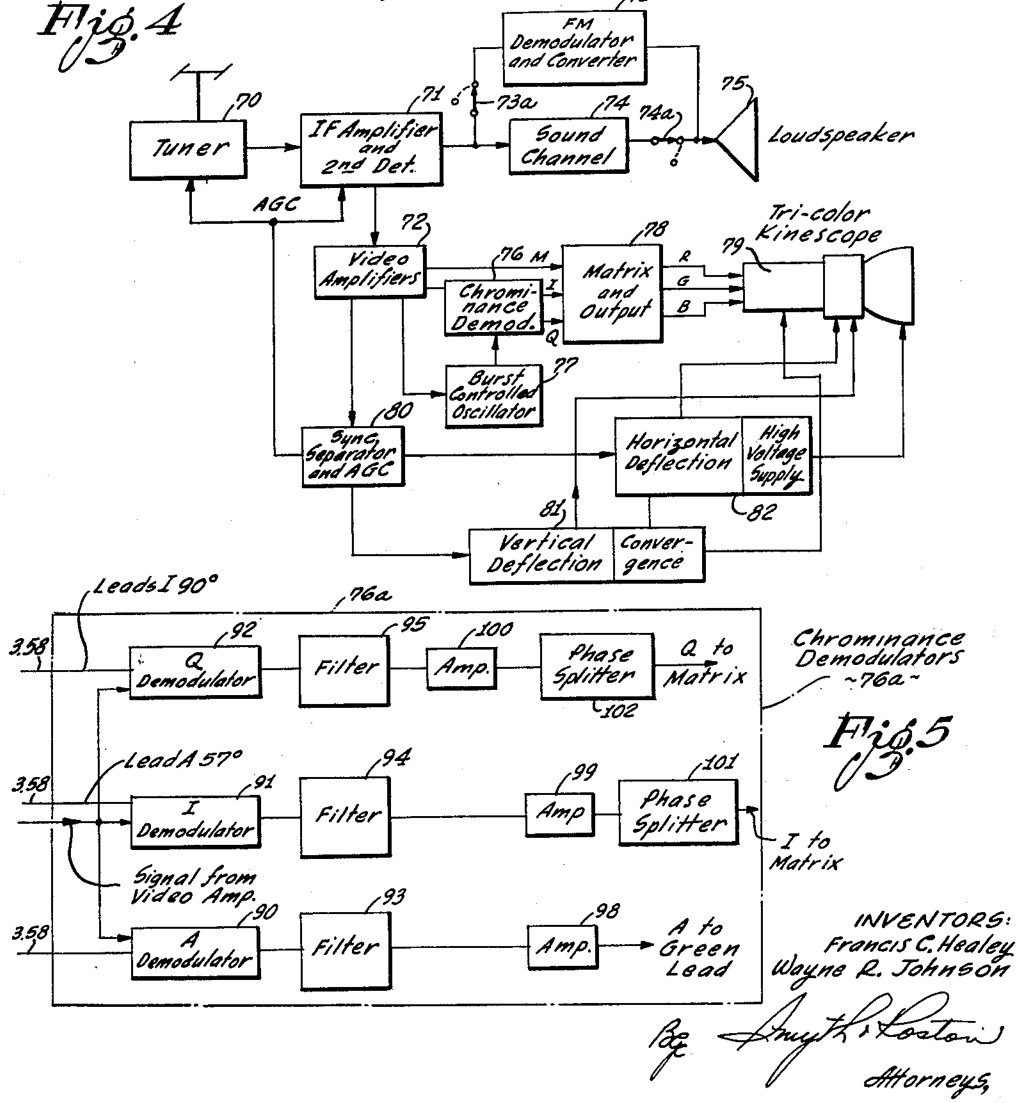
FIGURE 4 is a functional representation of a modified conventional color television receiver which may be utilized in the transducer system of this invention.
FIGURE 5 is a functional representation of a modified chrominance demodulator utilized in the color television receiver of a second embodiment of the transducer system of this invention.

The composite television signals, including the added, modulated or burst 3.58 megacycle sub-carrier and the 4.5 megacycle sound sub-carrier may be received at a conventional color television receiver of the type illustrated in FIGURE 4 or at a conventional black and white or monochrome television receiver, a portion of which is illustrated in FIGURE 2.

Referring first to FIGURE 4, the components illustrated therein may all be conventional color television components except for the FM demodulator and converter 73 which is responsive to the auxiliary audio signals and to the alarm signal. Very briefly, the signals are received by a tuner 70 which provides them to an IF amplifier and second detector 71. The 4.5 megacycle sound sub-carrier is demodulated and the modulaing signals are coupled from the intermediate frequency amplifier through a sound channel 74 and a switch **74*a* to a loud speaker 75. The subsonic 25 kilocycle per second sub-carrier and the alarm signals, if any, which are provided respectively by the modulator 16 and the alarm circuit 40 in FIGURE 1, are introduced through a switch 73*a* to the demodulator and converter 73 which demodulates the sub-carrier and also converts the alarm signal to an audio signal providing the demodulated and converted signals to the speaker 75. The auxiliary audio signals are, in this manner, recovered and an audible indication is provided responsive to the operation of the computer 38 or the manual operation of an operator. Either of the switches 73*a* or 74*a*** may be operated so that either the primary or the auxiliary sound information are received.

Referring still to FIGURE 4, the signals from the second detector 71 are supplied to video amplifiers 72. The monochrome "M" signal is introduced from the amplifiers 72 to a matrix and output circuit 78 which supplies the three primary color signals to the kinescope 79. The synchronizing pulses are separated in a synchronous separator 80 and supplied to deflection circuits 81 and 82 which control the operation of the kinescope 79. The high frequency components of the composite signal consisting mainly of the modulated sub-carrier signal are applied to a chrominance demodulator 76.

The color television receiver is designed for recovering the NTSC color television signal which is standard in the United States. The NTSC color television signal includes a signal representative of the luminance and brightness of the successive picture points regardless of their color and also includes side bands resulting from the modulation of two chrominance signals on two 3.58 megacycle sub-carriers. The modulated sub-carriers, which are of the same nominal frequency but in phase quadrature, are combined to produce a single train of color signals modulated in both phase and amplitude.

At the beginning of each of the horizontal scanning lines which trace the color television picture, a color synchronizing signal is supplied which includes a burst of the color sub-carrier frequency. The burst of color sub-carrier frequency is utilized as a reference signal to establish the phase of an oscillator 77 in the television receiver. The signal from the oscillator 77 in the receiver is resolved into orthogonal components which are employed in two separate demodulators in the chrominance demodulator 76 to recover the two chrominance signals. The hues reproduced at the receiver are in general dependent upon the phase of the sideband frequencies as compared with the phse of the periodic bursts of the reference frequency and the intensity of the hues is dependent upon the amplitude of the sideband frequencies.

Figure 3:
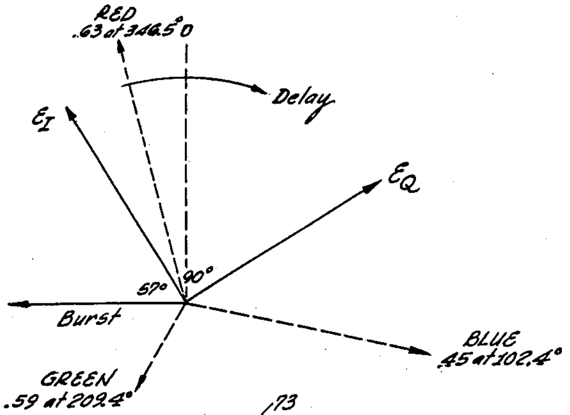
FIGURE 3 is a vector diagram illustrating the operation of conventional color television systems.

Actually, the color burst is out of phase with both quadrature signals, leading one by 57° and the other by 147° as illustrated in FIGURE 3. FIGURE 3 also illustrates the phase relationship between the chrominance signals and the three primary color signals which are provided from the matrix and output circuit 78 to the kinescope 79.

When only monochrome television signals are being transmitted, chrominance signals are not received and the video amplifiers 72 do not, of course, provide any chrominance signals to the chrominance demodulators 76. When the received signals include bursts of sub-carrier frequency representing the auxiliary image, these signals are introduced from the video amplifier 72 to the chrominance demodulator 76 ordinarily utilized for the regular chrominance signals. The chrominance demodulator 76, therefore, provides two signals designated I and Q information signals to the matrix and output circuit 78 which are derived from the modulated color bursts of sub-carrier frequency. As indicated above, the matrix and output circuit 78 controls the kinescope 79 providing the monochrome M signals representing the primary image thereto together with color information representing the auxiliary range. The screen of the kinescope 79 would, therefore, provide a monochrome image superimposed by a color image of the information on the tape 30 in FIGURE 1. If the scanned tape 30 at the transmitter includes printed symbols, the symbols in color would be superimposed over the primary monochrome image.

The proportions of the bursts of sub-carrier signal which are translated to I and Q signals may be readily calculated from a consideration of FIGURE 3. As indicated above, the bursts of sub-carrier signals may lead the I signal by 57 degrees and the Q signal by 147 degrees. The I signal provided from the demodulators 76 would, therefore, be equal to the cosine of 57 degrees times the bursts signal, and the Q signal would be the cosine of 33 degrees times the bursts signal. In other words, the two signals would be attenuated versions of the bursts of the sub-carrier signals.

The following three conventional matrix equations illustrate the operation of the matrix and output circuit 78 for translating the M, I and Q signals provided thereto to red, green and blue color signals to the kinescope 79.

$$\text{Red signal} = 1.00M + 0.96I + 0.62Q$$
$$\text{Green signal} = 1.00M - 0.27I - 0.65Q$$
$$\text{Blue signal} = 1.00M - 1.11I + 1.70Q$$

With $I=A \cos 57°$ or $.5446A$ and $Q=A \cos 33$ or $.8387A$, the exact combination of primary colors resulting from the burst signal is determined. If the phase of the color bursts representing the auxiliary images is changed, the magnitude of the I and Q signals and, therefore, of the received color changes therewith.

The equipment associated with the auxiliary camera equipment 33, may include an adjustable phase delay circuit 39, shown in phantom in FIGURE 1, for changing the phase of the sub-carrier signal and, therefore, of the color of the superimposed image.

The modified monochrome television signal which includes the added signal introduced by the camera 33 is compatible with monochrome television receivers. FIGURE 2 illustrates components of a conventional monochrome receiver and of an adapter 67 which is hereinafter described. As shown in FIGURE 2, the composite signal is received at the receiving circuits 50 which demodulate the signal providing the synchronizing, video and audio signals through a switch 51 respectively to the amplifiers 53, 54 and 55. The amplifier 53 and the amplifier 54 control the cathode ray tube 56 which is a conventional black and white receiving tube. The bursts of sub-carrier signals are not detected by the cathode ray tube 56 by the viewer because they effectively cancel due to the frequency-interlace principle.

Figure 6:
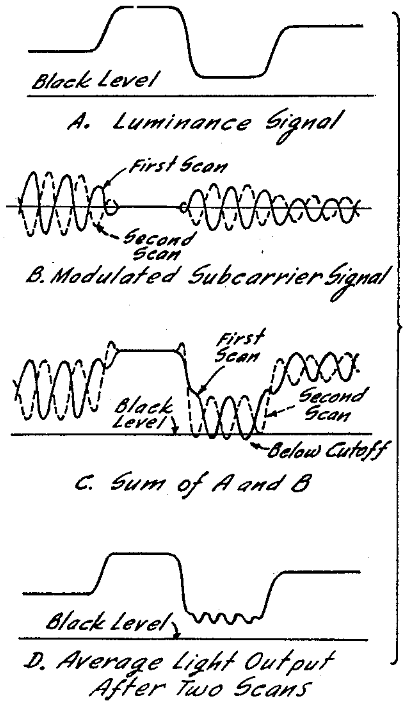
FIGURE 6 is a series of curves illustrating the frequency-interlace principle providing for the compatibility of the color television system with conventional monochrome television systems.

FIGURE 6 illustrates the frequency-interlace principle with curve A being the monochrome signal and curve B illustrating a modulated sub-carrier signal for two successive scans. The 3.58 megacycle sub-carrier, which is synchronized with the primary television signals, is an odd multiple of one-half the frame frequency so that it reverses in polarity between successive scans as illustrated by curve B in FIGURE 6. The sub-carrier reverses in polarity between successive scans because it passes through some whole number of cycles plus one-half during each frame period. If there is no appreciable motion in the image from frame to frame, the monochrome signal for the second scan is exactly like that for the first, but the sub-carrier signal is now 180 degrees out-of-phase as indicated by the dotted line in curve B of FIGURE 6. The composite signal of the monochrome and sub-carrier signals for two successive scans is illustrated by curve C and the average output of two scans is illustrated in curve D.

The sub-carrier component which is added to the monochrome signal, therefore, causes no objectionable interference because it is effectively cancelled out by the persistence of vision. The effective response of the eye is controlled not so much by the instantaneous stimulation provided by any one scan as by the average or integrated stimulation over two or more scans. The sub-carrier signals which are frequency-interlaced by an odd multiple of one-half the frame frequency cancel so that a visible image is not provided on the tube 56.

The adapter 67, briefly mentioned above which is shown in FIGURE 2, may be utilized for adapting the conventional monochrome receiver to supply an image of the tape 30 as scanned by the camera 33 in FIGURE 1.

The adapter 67 includes two-position switches 68 and 69 which, when set in their off position effectively disconnect the adapter 67 so that an image of the tape 30 is not provided on the face of the tube 56 and auxiliary audio signals are not provided to a speaker 59. When the switch 69 is set to its on position, an image of the tape 30 is provided on the face of the tube 56. The image of the tape 30 may be superimposed upon the monochrome image due to the monochrome television signals through the switch 51 to the tube 56. In other words, the reception of the regular television picture and the reception of the auxiliary image may be superimposed, or either may be received in accordance with the setting of the switches 51 and 69.

The sub-carrier burst signals are separated from the rest of the video signals by a 3.58 megacycle bandpass filter 60 and introduced therefrom to a full wave detector 62. The detector 62 rectifies the 3.58 megacycle signals and introduces the rectified signals to a low pass filter 65. The filter 65 has a bandpass up to 1.5 megacycles so that the sub-carrier frequency is removed and only the envelope or modulating signal is provided. The modulating signal is introduced to a limiter or trigger circuit 66 which effectively rectangularizes the modulating signal. The trigger circuit 66 is responsive only to signals over a predetermined amplitude level. The square waves from the circuit 66 are introduced through the switch 69 to the cathode ray tube 56. The signals are exactly synchronized with the regular video signals being received by the receiving circuits 50 due to the operation of the equipment described above which is associated with the camera 33.

The subsonic or supersonic alarm signals, which are generated by the alarm circuit 40 in FIGURE 1, are coupled through the amplifiers 57 and the switch 68 to an audible alarm 64 which converts them to audible signals. The 25 kilocycle per second sub-carrier is demodulated in the frequency demodulator or detector 58 and the recovered audio modulating signals are introduced through a switch to the speaker 59.

The above sequence of operations for providing superimposed images at a color receiver and at monochrome receiver was described above in conjunction with conventional monochrome television transmission. As indicated above, however, superimposed images may be provided when the primary television signals provided by the camera 10 in FIGURE 1 are the three primary color signals and the signals provided from the control unit 12 are the NTSC luminance and chrominance signals representing the primary image in color.

The sequence of operations through the transducer system of this invention as described above in reference to FIGURES 1, 2, 3 and 4 is substantially the same when the primary signals are color signals as when they are monochrome signals. The additional signal provided under control of the camera 33 is now combined with the two quadrature chrominance signals in the adding circuit 25, all three being at the same normal frequency but at different phases.

The composite signal, including the chrominance signals and the added signal from the modulator 34, are modulated as a composite sub-carrier on the television carrier signal in the transmitter 26. The phase of the 3.58 megacycle carrier to the modulator 34 may be the same as that of the reference burst signal of the chrominance signals whereas the phase of the two chrominance signals lag the phase of the reference burst respectively by 57 degrees and 147 degrees. As illustrated in FIGURE 3, the effect of the added signal which is in phase with the burst signal is to provide an additional component for each of the two chrominance signals. Actually, when the added signal is provided only during the last 50 lines of each frame the color information of the last 50 horizontal lines of each frame is modified by the addition of the added signal from the modulator 34.

In the color television receiver shown in FIGURE 4 and described above, the original chrominance signals each modified by the added signals are recovered from the chrominance demodulator 76.

The color image provided at the kinescope 79 is the primary color image as provided by the camera 10 with the color at the discrete symbols of the auxiliary image being modified. In other words, the scanned letters on the tape 30 in FIGURE 1 appear as sharp color changes or color distortions at the color receiver. The particular colors at the auxiliary image symbols are due, therefore, to a combination of both the primary and auxiliary signals at the discrete symbol positions at the kinescope 79. The particular colors may be changed by adjusting the delay circuit 39 at the transmitter.

In the monochrome receiver in FIGURE 2, the limiter or trigger circuit 66 discriminates between the chrominance signals and the added bursts of sub-carrier frequency.

The added bursts are at an amplitude greater than the maximum amplitude of the chrominance signals and the circuit 66 has an input response or triggering lever greater than this maximum amplitude. The bursts are transmitted at a greater amplitude level from the transmitter 26 because, as provided by the modulator 34, they are at a greater level than the maximum level of the chrominance signals from the unit 12.

The adapter 67 functions, therefore, to provide an auxiliary image when the received signals are either monochrome or color television signals representing the primary image multiplexed with the bursts of sub-carrier signals representing the auxiliary image. Without the adapter 67, the monochrome receiver does not provide an image of either the chrominance or the added signals because they are all cancelled in accordance with the frequency-interlace principle due to the persistence of vision.

The color television receiver illustrated in FIGURE 4 may also be adapted to control the color and increase the sharpness of the added signals as superimposed over the monochrome image or over a regular color television image. FIGURE 5 illustrates a functional representation of a modified chrominance demodulator 76*a* which includes the two usual branches for the two chrominance signals, I and Q, and a third branch for the added or A signal. The phase of the 3.58 megacycle sub-carriers which are introduced to the three modulators are adjusted to be in phase respectively with the two chrominance signals and with the added signal. The 3.58 megacycle signal to the A demodulator 90, therefore, leads the phase of the 3.58 megacycle signal to the I demodulator 91 by 57 degrees and the phase of the 3.58 megacycle signal to the demodulator 92 by 147 degrees. The output of the A demodulator 90 will include essentially the added modulating signal and also some portions of the two chrominance signals.

The output is coupled from the demodulator 90 through a filter 93, which removes the sub-carrier, to an amplifier 98. The two channels for the I and Q signals are conventional including respectively the filters 94 and 95 and the amplifiers 99 and 100, the latter of which may include delay compensation networks not shown. The I and Q channels include respectively the phase-splitters 101 and 102 because both negative and positive signals are required at the matrix and output circuit 78.

The signals provided through the I and Q channels include the chrominance signals and also a portion of the added signals. This is apparent upon consideration of FIGURE 3 and from the description above in reference to the operation of the conventional demodulator 76 when the added signal is utilized with monochrome transmission. The signal through the A channel from the amplifier 98, which includes portions of the chrominance signals, may be introduced to any one of the three primary color leads R, G or B to the kinescope 79 or it may be introduced to the matrix and output circuit 78 as an addition to the "M" or luminance signal. In the latter case, the printed symbols on the tape 30 would be represented in black on the kinescope 79.

Figure 7:
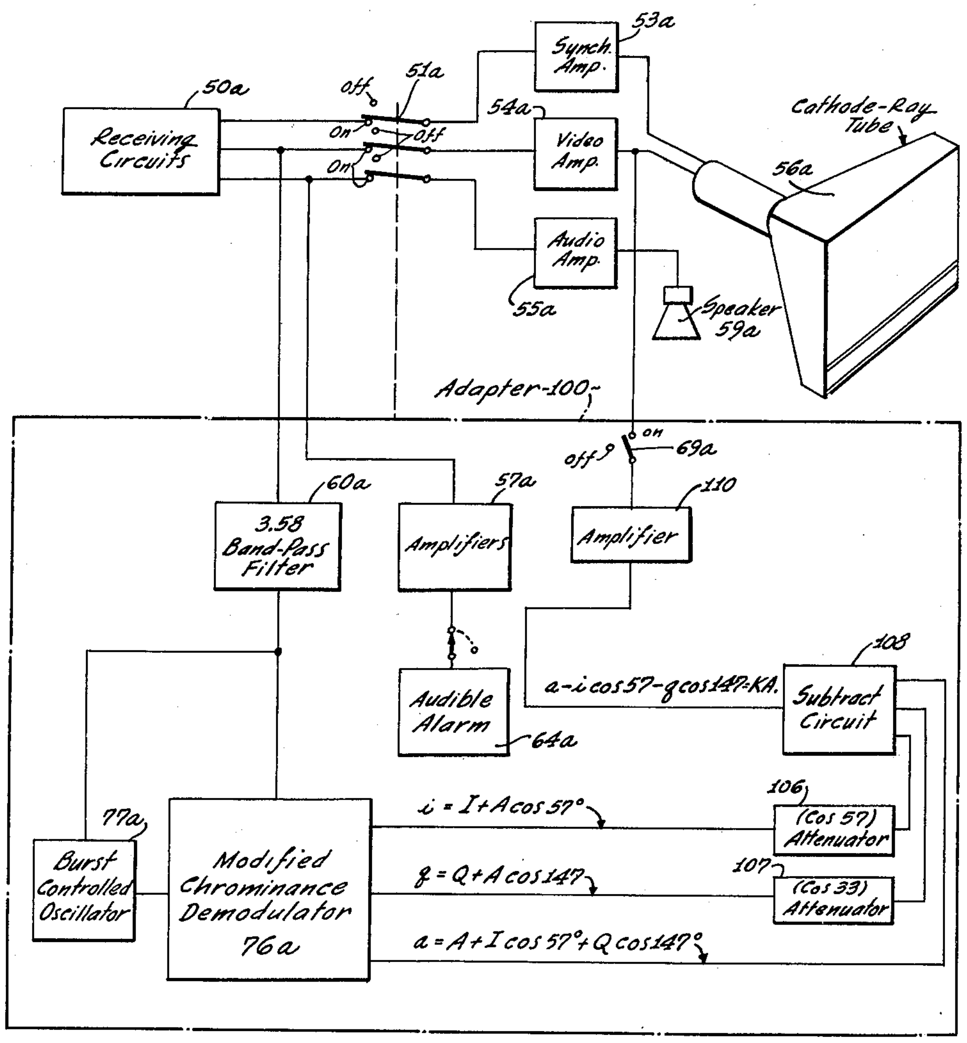
FIGURE 7 is a functional representation of a portion of a monochrome receiver including an adapter utilized in a third embodiment of the transducer system of this invention.

The chrominance modulator 76*a* as shown in FIGURE 5 may also be utilized as part of a monochrome television adapter 100 in FIGURE 7 which functions to separate the added signal from the chrominance signals. In FIGURE 7, the components which are similar to the components described above in reference to FIGURE 2, include similar reference numbers with the suffix *a*. The 3.58 sub-carrier signals are separated by means of a bandpass filter 60 from the rest of the video signals and introduced to the modified chrominance demodulator 76*a* is in the form of three signals, being essentially the two quadrature chrominance signals modified by the additional or burst signal and the additional signal as modified by the two chrominance signals. The mathematical relationships indicated at the output of the demodulator 76*a* in FIGURE 7 are apparent upon consideration of the phase relationship of the signals in reference to FIGURE 3. The additional signals are in phase with the reference burst signals so that they lead the I chrominance signals by 57 degrees and the Q chrominance signals by 147 degrees.

The output $i$ of the I channel of the demodulators 76 may be represented by the expression: $I+A \cos 57°$, and the output $q$ of the Q channel may be represented by the expression $Q+A \cos 147°$, where I and Q are the original chrominance signals and A is the original added signal.

The $i$ and the $q$ signals are introduced respectively to the attenuators 106 and 107 wherein the $i$ signal is attenuated to cos 57 or .5446 of its magnitude and the $q$ signal is attenuated to cos 145 or .8387 of its magnitude. The two attenuated signals are subtracted from the output of the A channel of the modified chrominance demodulator 76 in a substracting circuit 108. The portions of the attenuated signals corresponding to the original chrominance signals are exactly equal in magnitude to the magnitudes of the original chrominance signals coupled through the A channel so that they cancel.

The following equations illustrate the mathematics involved in the subtraction of the two attenuated signals and the fact that the chrominance portions cancel:

(1) Output from the subtracting circuit $108=a-i \cos 57-q \cos 147$.

(2) By substituting the expressions for $a$, $i$ and $q$ as indicated at the output of the demodulators in FIGURE 7, the output$=A+I \cos 57+Q \cos 33-(I+A \cos 57) \cos 57-(Q+A \cos 147) \cos 147$.

(3) By removing the parentheses and cancelling terms the output$=(A \cos 57) \cos 57-(A \cos 147) \cos 147=KA$ where K is a constant. All terms having the original I and Q signals, therefore, are cancelled and the remaining signal which is proportional only to the added signal representing the auxiliary image is coupled to an amplifier 110. The output of the amplifier 110 is introduced to the cathode ray tube *56a*.

The adapter 100, in this manner, performs the same broad function of separating the added signal from the chrominance signals as does the adapter 67 in FIGURE 2. In the adapter 67, the discrimination between the chrominance signals and the added signal is accomplished by the trigger circuit 66 which responds only to the signal levels of the added signal. The adapter 100 may be utilized even when the signal levels do not differ, as its discrimination depends upon the phase differences of the three sub-carrier signals.

The principles described above in reference to the adapters 67 and 100 can be utilized in conjunction with color television receivers. The added signal can be separated from the chrominance signals utilizing either a trigger circuit 66 or the modified demodulator *76a* and the circuits 106, 107 and 108 (FIGURE 7).

The auxiliary signals need not be constant amplitude bursts as the signal provided by the trigger circuit 66, responsive to an amplitude over a predetermined threshold, can vary in accordance with variations of the modulation of the bursts. When phase discrimination is utilized to separate the auxiliary signals, a threshold response is, of course, not required.

Although this application has been disclosed and illustrated with reference to particular applications, the principles involved are susceptible of numerous other applications which will be apparent to persons skilled in the art. For example, the alarm signal which is recovered at the receiver may be utilized to provide a visual as well as an audible indication by utilizing it to control the operation of the receiver cathode ray tube. Moreover, the principles of the invention are applicable to other systems such as closed television systems utilizing cables as the communication channels instead of radio links. The invention is, therefore, to be limited only as indicated by the scope of the appended claims.

What is claimed is:

1. In a multiplexing system, means for producing color television signals, including, luminance and chrominance signals representing a primary image, means coupled to said producing means for modifying said chrominance signals in accordance with signals representing an auxiliary image, a monochrome television receiver for receiving said luminance and said modified chrominance signals and including a single kinescope for providing an image in accordance with said luminance and said modified chrominance signals, and means operable in conjunction with said receiver for recovering from said modified chrominance signals the signal representing said auxiliary image and for introducing said recovered signal to said receiver to provide on the single kinescope an image which is a reproduction of said auxiliary image.

2. The combination set forth in claim 1, in which the modified chrominance signals occur at a frequency interlaced with the frequency of the luminance signals and in which the recovering means is responsive to the modified chrominance signals in accordance with the interlaced frequency of the chrominance signals to obtain the reproduction of the auxiliary image.

3. In a multiplexing system, means for producing color television signals including luminance signals and chrominance sub-carrier signals representing a color image, means coupled to said producing means for generating a sub-carrier signal of the same frequency as the chrominance signals and in step therewith, means coupled to said generating means for modulating said generated sub-carrier signal in accordance with an image to be superimposed on the color image, and means coupled to said modulating means for combining said modulated sub-carrier signal and said chrominance sub-carrier signals produced by said producing means.

4. A multi-camera television system for transmitting signals representing superimposed images, means including a first camera for scanning a first image and for providing electrical signals representing the luminance and color of the first image, means coupled to said first camera for producing control signals synchronized with said electrical signals from said first camera, means including a second camera coupled to said producing means and synchronized by said control signals with said electrical signals from said first camera for scanning a second image and for producing electrical signals representing the luminance of the second image, and means coupled to said first camera and to said second camera for superimposing said electrical signals representing the second image on said electrical signals representing the first image to produce a single signal representing the composite of the first and second signals.

5. A multiplex transmission system for line-scanned image signals wherein information is carried by two quadrature sub-carrier signals of the same frequency, including, means for receiving the two quadrature sub-carrier signals, first means coupled to said receiving means for generating a wave having substantially the same instantaneous frequency as the instantaneous frequency of the two quadrature sub-carrier signals, second means coupled to said receiving means for generating synchronizing signals, means including a camera coupled to said second means for developing line-scanned image signals which are synchronized with the received quadrature sub-carrier signals, means coupled to said first means and to said developing means for modulating said generated wave with said developed image signals, means coupled to said modulating means for adding said modulated wave to the two quadrature sub-carrier signals, and means coupled to said adding means for transmitting the added signals and wave from said adding means.

6. In a multiplex television transmission system wherein a first image and a second image independent of the first image are superimposed and wherein the control of the first image is not dependent on the control of the second image, first means for generating video signals at a predetermined frame frequency representing the first image, second means coupled to said generating means for providing a modulated sub-carrier having a carrier frequency related to the frame frequency of the video signals and a modulation representing the second image and having a frame frequency equal to the frame frequency of the video signals, means coupled to said generating means and to said providing means for transmitting the video signals and the modulated sub-carrier, means coupled to said transmitting means for receiving the transmitted video signals and the modulated sub-carrier, and means including a single kinescope coupled to said receiving means for operating upon the received signals to provide two superimposed images on the kinescope, one being the first image as represented by the video signals and the other being the second image as represented by the modulated sub-carrier.

7. The combination set forth in claim 6 in which the second means is constructed to apply the modulations representing the second image to the sub-carrier only during a portion of a frame period to have the second image superimposed on a portion of the first image.

8. In a television system wherein a number of images are superimposed, first means for generating television signals representing a first image, second means coupled to said generating means for developing synchronizing signals and a carrier wave which are in step with the generated television signals, third means coupled to said developing means for generating a modulating signal which is synchronized with the television signals wherein the modulation information represents a second image, means coupled to said carrier wave developing means for modulating the carrier wave by said modulating signals, means responsive to said television signals and said modulated carrier wave for mixing the television signals and the modulated carrier wave for transmission, means for receiving said television signals and said modulated carrier wave, first means responsive to the received signals for separately recovering said television signals and said modulated carrier wave, second means coupled to said first recovering means for recovering from said modulated carrier wave the signal which corresponds to said modulating signal, and means including a cathode ray tube coupled to said first and second recovering means for providing two superimposed images corresponding respectively to said first image and to said second image.

9. The combination set forth in claim 8 in which the first and second images are different and in which the first and third means are disposed relative to each other and constructed to generate the television signals and the modulating signal independently in accordance with the different images.

10. The combination set forth in claim 8 in which the first means generate television signals representing the first image on a monochrome basis and in which the third means generate a modulating signal representing the second image on a monochrome basis.

11. In a multiplexing system, means for producing color television signals including luminance signals and chrominance sub-carrier signals representing a color image, means coupled to said producing means for modifying said chrominance sub-carrier in accordance with an auxiliary image to be superimposed on the color image, means for receiving said luminance and said modified chrominance signals, and means including a single cathode ray tube coupled to said receiving means for developing signals representing the modification of said chrominance signals and for developing the luminance signals and the chrominance sub-carrier signals representing the color image whereby a reproduction of the auxiliary image may be provided on the cathode ray tube and whereby the reproduction of the color image may also be provided on the cathode ray tube.

12. In a combination for use with a transmission system for television signals including modulated sub-carriers wherein the sub-carriers are provided with frequency characteristics to prevent any visual effect on monochrome television receivers and wherein the sub-carriers are modulated to represent video information, an adapter for the monochrome television receivers including means responsive to the reception of the modulated sub-carriers and the television signals by the receiver for separating said sub-carriers from the received television signals, and means coupled to said separating means for operating upon the sub-carriers to develop a signal representing the modulation of said sub-carriers and for introducing the developed signal as video signals to said receiver for visual indication in the receiver.

13. In a television transmission system, first means for developing first television signals representing a first image, second means for developing second television signals representing a second image, means for frequency interlacing said first and said second television signals and for transmitting the frequency interlaced television signals over a single television transmission channel, means for receiving said transmitted television signals, and means including switching means for providing either superimposed reproductions of said first and said second images or a reproduction of either said first or said second images.

14. The combination set forth in claim 13 in which the first and second images are different and in which the first and second means are disposed relative to each other and constructed to independently generate the television signals in accordance with the different images.

15. The combination set forth in claim 13 in which the first means generate television signals representing the first image on a monochrome basis and in which the second means generate television signals representing the second image on a monochrome basis.

16. In combination for use with a television transmission system for operating upon television signals including a modulated sub-carrier signal, means for receiving the television signals including a modulated sub-carrier signal, means coupled to said receiving means for recovering the modulated sub-carrier signal, means responsive to the modulated sub-carrier signal for rectifying said sub-carrier signal, means coupled to said rectifying means for demodulating the rectified signal, a trigger circuit coupled to said demodulating means and responsive to demodulated signals over a predetermined threshold for providing a control signal, and means including a cathode ray tube coupled to said trigger circuit for providing a visual indication of the modulation information of the sub-carrier signal.

17. In a television transmission system, first means for developing color television signals representing a first image, second means for developing monochrome television signals representing a second image, third means responsive to the television signals representing the first and second images for concurrently transmitting said color television signals and said monochrome television signals over the same channel, means for receiving the concurrently transmitted color and monochrome signals, and means coupled to said receiving means and including a single cathode ray tube for operating upon the television signals representing the first and second images to provide superimposed reproductions of said first and said second images, where the reproduction of said first image is in color.

18. The combination set forth in claim 17 in which the monochrome television signals occur at a particular frame frequency and in which the color television signals occur at one-half of an odd multiple of the frame frequency and in which the reproducing means coupled to the receiver are responsive to the color television signals in accordance with the particular frequency of such signals to obtain the reproduction of the image represented by such signals.

19. The combination set forth in claim 17 in which the second means is constructed to develop the monochrome television signals representing the second image only during a cyclically recurring portion of a time in which the first means develops the color television signals representing the first image to have the second image superimposed on a portion of the first image.

20. In a multiplexing system, means for producing color television signals including luminance and chrominance signals and representing a primary image, means coupled to said producing means for modifying said chrominance signals in accordance with signals representing an auxiliary image, a monochrome television receiver for receiving said luminance and said modified chrominance signals, said television receiver including a cathode ray tube, electrical means operative in conjunction with said television receiver for separately recovering said luminance signals and said modified chrominance signals, electrical means responsive to said luminance signals and said modified chrominance signals for providing in said cathode ray tube an image which is a reproduction of said primary image, electrical means operable in conjunction with said receiver for recovering from said modified chrominance signals a signal representing said auxiliary image, said recovering means including a trigger circuit responsive to signals over a predetermined level for providing video control signals in accordance with the modification of the chrominance signal, and electrical means responsive to the recovered signal representing the auxiliary image for introducing said recovered signal to said receiver to provide in said cathode ray tube an image which is a reproduction of said auxiliary image.

21. The combination set forth in claim 20 in which the color television signals represent frames of images at a particular frequency and in which said modified chrominance signals occur at an odd multiple of one-half of the frame frequency and in which the recovering means for the auxiliary image is responsive to the modified chrominance signals in accordance with the particular frequency of such signals to recover the signals.

22. In a television transmission system, means for developing color television signals representing a first image, means for developing monochrome television signals representing a second image, means coupled to said color television signal developing means and to said monochrome television signal developing means for concurrently transmitting said color television signals and said monochrome television signals over the same channel, means for receiving the concurrently transmitted color and monochrome television signals, means responsive to the color television signals and to the monochrome television signals for separately recovering the color television signals and the monochrome television signals, means including a cathode ray tube responsive to the color television signals for obtaining a reproduction of the first image on the cathode ray tube, and means responsive to the monochrome television signals for obtaining a reproduction of the second image on the cathode ray tube in superimposed relationship to the first image.

23. The combination set forth in claim 22, in which the color television signals are in frequency-interlaced relationship to the monochrome television signals and in which the reproducing means for the color television signals are constructed to convert the signals to a form for the reconstruction on the cathode ray tube of the image represented by the signals.

24. In a television transmission system in accordance with claim 22 including, in addition, first means associated with said color television signal developing means for developing sound signals related to said first image, second means associated with said monochrome television signal developing means for developing sound signals related to the second image, means coupled to said first and said second means for concurrently transmitting said sound signals related to said first and said second images together with said color and said monochrome television signals, and means associated to said concurrently receiving means for receiving and for separating said sound signals relating to said first image and said sound signals relating to said second image whereby either may be listened to.

References Cited in the file of this patent

UNITED STATES PATENTS

| | | |
|---|---|---|
| 2,870,248 | Valeton et al. | Jan. 20, 1959 |
| 2,877,290 | Le Blan | Mar. 10, 1959 |
| 2,878,318 | Leek | Mar. 17, 1959 |
| 2,907,830 | Boutry et al. | Oct. 6, 1959 |
| 2,927,958 | Kroger | Mar. 8, 1960 |
| 2,929,867 | Dennison | Mar. 22, 1960 |
| 2,931,855 | Abramson | Apr. 5, 1960 |
| 2,951,904 | Le Blan | Sept. 6, 1960 |

FOREIGN PATENTS

| | | |
|---|---|---|
| 110,148 | Australia | Apr. 4, 1940 |

OTHER REFERENCES

"Color Television Standards," NTSC; McGraw-Hill Book Co., Inc.; New York, 1955; page 110 cited.